INVENTOR.
FREDDIE J. HAYNES

INVENTOR.
FREDDIE J. HAYNES

Feb. 4, 1969  F. J. HAYNES  3,425,368
STUBBLE MUSHING AND DIRT REMOVING APPARATUS
Filed Dec. 16, 1966  Sheet 3 of 5

INVENTOR.
FREDDIE J. HAYNES
BY
Dunlap and Laney
ATTORNEYS

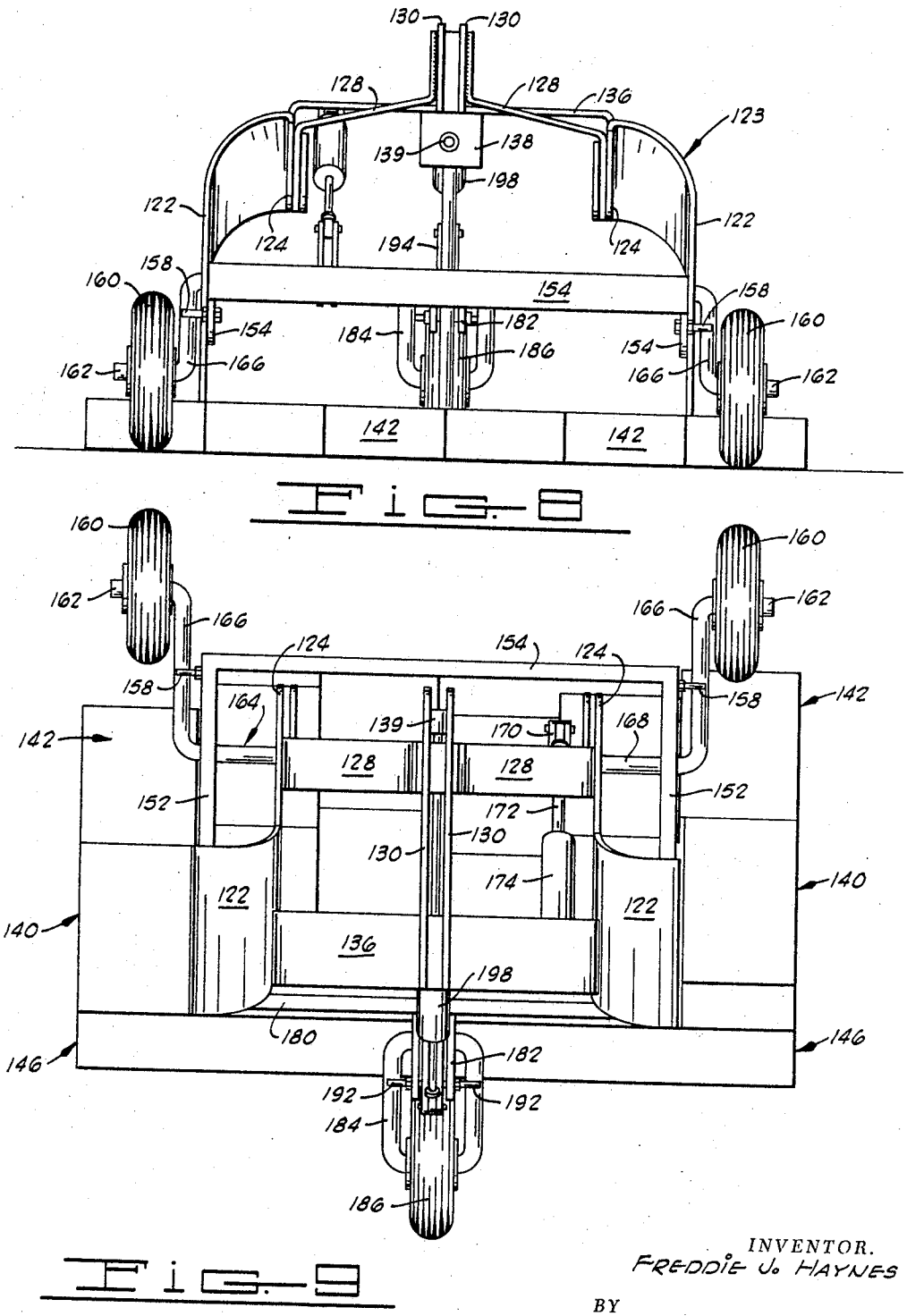

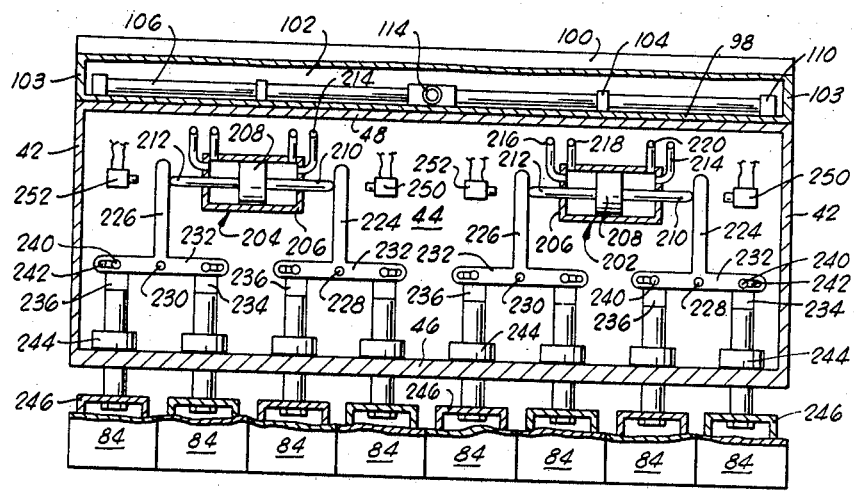
FIG-10
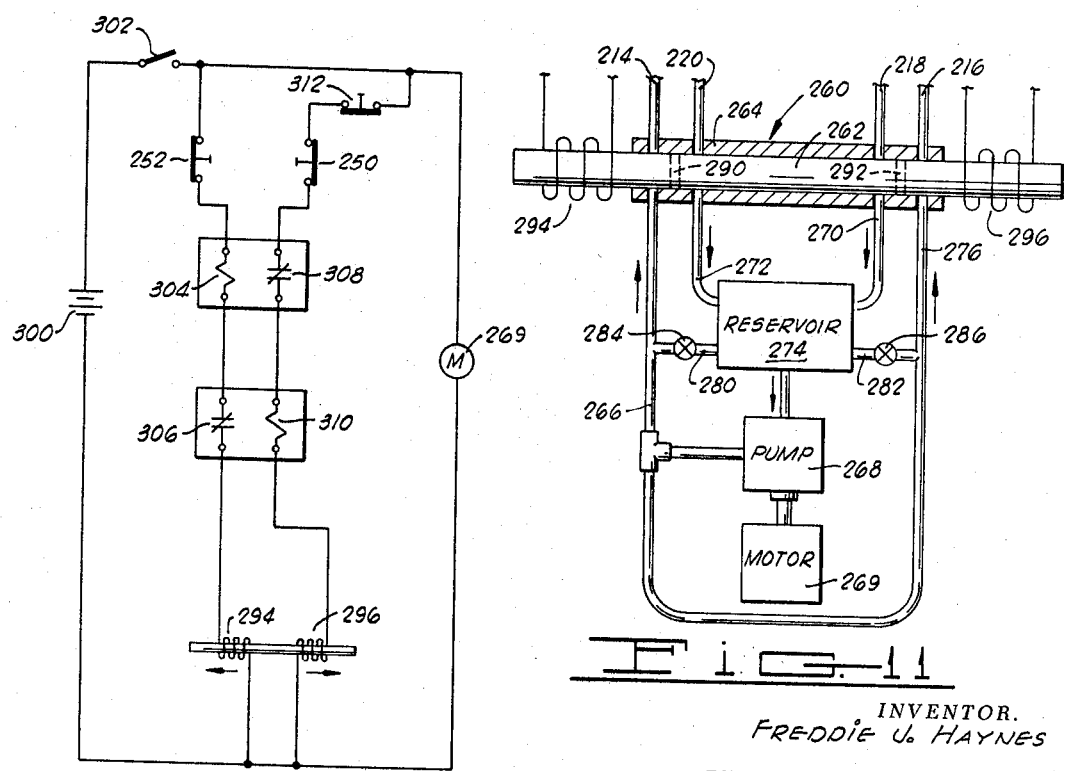
FIG-11
FIG-12
INVENTOR.
FREDDIE J. HAYNES
BY
ATTORNEYS

United States Patent Office 3,425,368
Patented Feb. 4, 1969

3,425,368
STUBBLE MUSHING AND DIRT REMOVING APPARATUS
Freddie J. Haynes, 1025 Woodcrest Drive, Midwest City, Okla. 73110
Filed Dec. 16, 1966, Ser. No. 602,361
U.S. Cl. 111—6
Int. Cl. A01c 23/02; A01b 35/00
20 Claims

ABSTRACT OF THE DISCLOSURE

An apparatus adapted to remove a layer of soil, deposit a fertilizer, and cover the fertilizer with the layer of soil previously removed.

---

Figure 1:
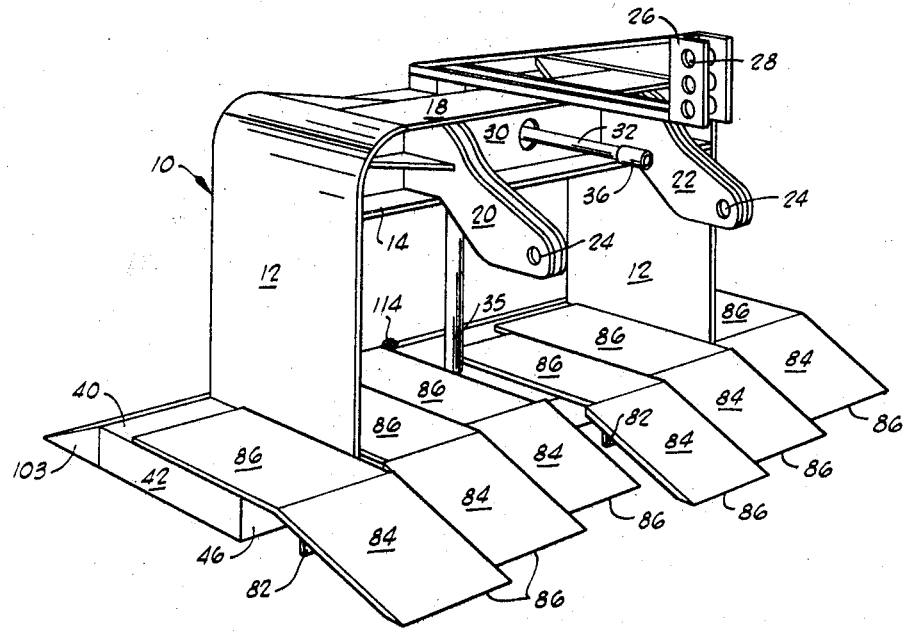

This invention relates to an apparatus for removing a layer of earth from the soil, such removal being accomplished so as to disturb the removed earth to a minimum degree. More particularly, the invention relates to apparatus for slicing through the earth at a selected depth below the surface thereof, and for depositing under the earth a chemical fertilizer or the like so as to retain a major portion of the deposited fertilizer under the earth.

The present invention proposes apparatus which can be utilized in agricultural and other operations for removing a surface layer of earth, asphalt or the like from the ground and depositing a chemical or other selected material beneath the removed layer as it is being automatically returned to the position occupied before removal. Broadly described, the apparatus includes a framework which is adapted to be connected behind an agricultural tractor or similar self-powered vehicle, and which carries a plurality of movable blades which are driven in reciprocation in a timed sequence, and in out-of-phase relation to each other. In their horizontal movements, the blades slice through the earth and remove a layer thereof which is then moved rearwardly relative to the framework and over supporting plate means. The supporting plate means, toward the rear of the framework, inclines downwardly so as to permit the earth to slide down the plate means at the rear of the apparatus and come to rest in substantially the same position from which it was removed as the framework moves forwardly across the ground. Means are provided for distributing a chemical beneath the framework toward the rear thereof so that by entrapment beneath the earth moving over the supporting plate means, the chemical is retained in the earth in the desired location. In one embodiment of the invention, the framework and reciprocating blades are supported on vertically adjustable wheels which can be adjusted in their position on the framework so as to accurately control the depth at which the blades move through the soil.

From the foregoing description of the invention, it will be perceived that a major object of the invention is to provide a dirt removing apparatus which can be used for stubble mushing crops, or for distributing fertilizer at a desired depth beneath the soil.

Another object of the invention is to provide a mechanically rugged, yet economically constructed, agricultural implement which can be used for removing a layer of earth in a rapid and efficient manner.

Another object of the present invention is to provide an excavating implement having a novel drive system which effectively cuts through the earth and removes a layer therefrom, and then redeposits the severed earth in substantially the same location which it occupied prior to the excavating operation.

In addition to the foregoing described objects and advantages, additional objects and advantages will become apparent as the following detailed description is read in conjunction with the accompanying drawings which illustrate the invention.

Figure 2:
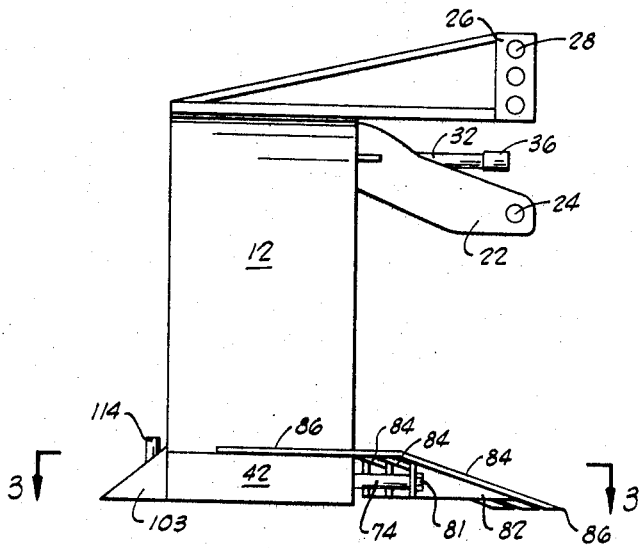
Figure 3:
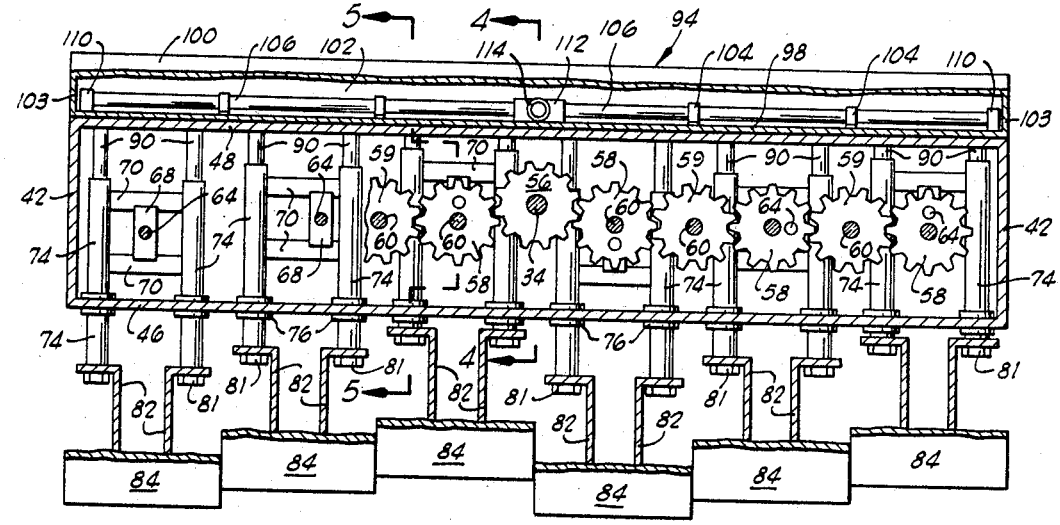
Figure 4:
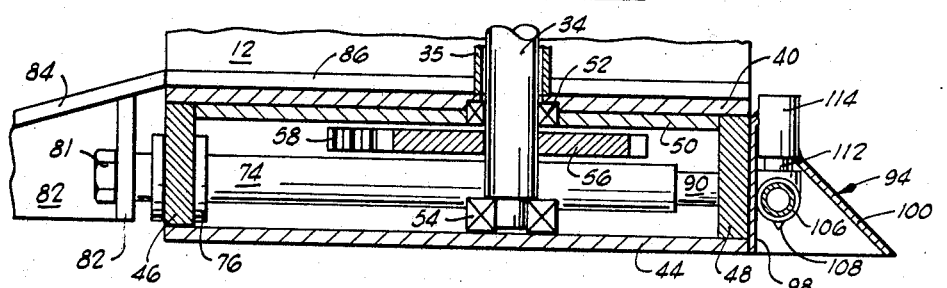
Figure 5:
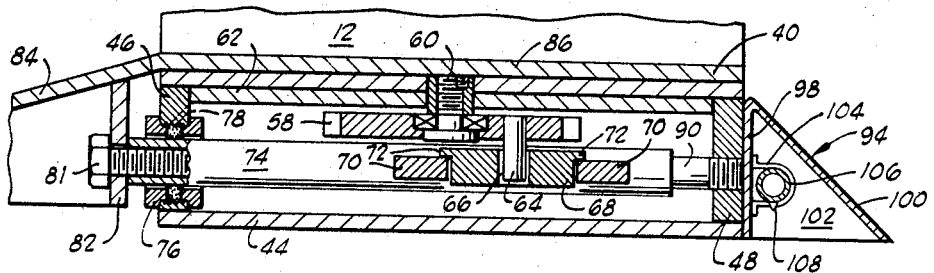
Figure 6:
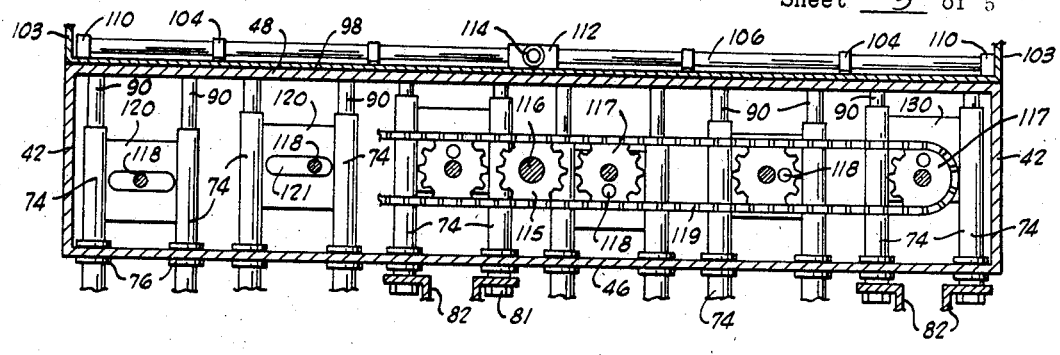
Figure 7:
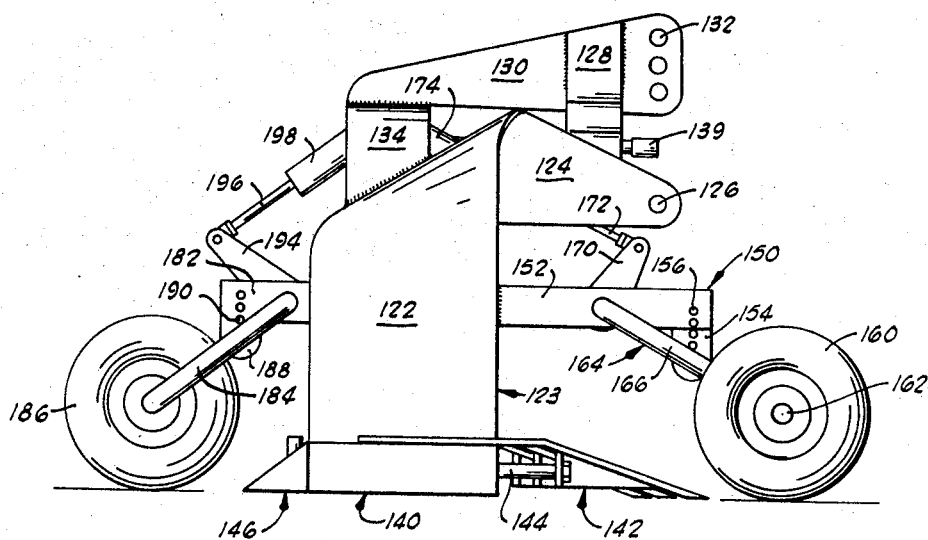

In the drawings:
FIGURE 1 is a perspective view of one embodiment of the dirt removing apparatus of the invention.
FIGURE 2 is an end view in elevation of the apparatus depicted in FIGURE 1.
FIGURE 3 is a sectional view taken along line 3—3 of FIGURE 2 and showing some of gearing broken away and removed to illustrate underlying parts of the transmission system.
FIGURE 4 is a sectional view taken along line 4—4 of FIGURE 3.
FIGURE 5 is a sectional view taken along line 5—5 of FIGURE 3.
FIGURE 6 is a detail view illustrating a different type of transmission or drive system which can be utilized in the present invention for driving the cutting blades thereof in an out-of-phase, reciprocating motion.
FIGURE 7 is an end view in elevation illustrating a different embodiment of the invention.
FIGURE 8 is an elevation view of the embodiment of the invention depicted in FIGURE 7 showing the machine as it appears from the front.
FIGURE 9 is a plan view of the embodiment of the invention illustrated in FIGURE 8.
FIGURE 10 is a sectional view similar to FIGURE 3 but showing a different drive system.
FIGURE 11 is a schematic illustration of another portion of the drive system illustrated in FIGURE 10.
FIGURE 12 is an electric circuit diagram illustrating electrical circuitry used in the drive system shown in FIGURES 10 and 11.

Referring now to the drawings in detail and particularly to FIGURE 1, reference numeral 10 designates generally a framework having a pair of vertically extending frame members 12 which are interconnected by a lower horizontal plate 14 and an upper horizontal plate 18. Secured between the horizontal plates 14 and 18 are a pair of horizontally spaced side or outer hitch brackets 20 and 22 which carry apertures 24 facilitating the attachment of the dirt removing apparatus to a self-powered vehicle, such as a farm tractor or the like. A central hitch bracket 26 is secured to the upper horizontal plate 18 and is disposed at a vertical level above the two side hitch brackets 20 and 22. The central hitch bracket 26 carries a plurality of hitch pin apertures 28 which permit the central hitch link extending from a tractor to be adjustably connected at several vertical positions relative to the framework 10. A gear box 30 is disposed between the horizontal plates 14 and 18 and encloses gearing which permits the rotational movement of a drive shaft 32 to be transferred to a vertical drive shaft 34. The drive shaft 32 is provided at its end with a coupling 36 facilitating connection of this drive shaft to the power takeoff of a tractor or similar vehicle.

At their lower ends, each of the vertically extending frame members 12 is welded or otherwise suitably secured to the upper surface of a horizontally extending deck plate 40. The deck plate 40 is apertured midway of the length thereof to permit the drive shaft 34 to be extended therethrough. At each of its ends, the deck plate 40 is secured to an end plate 42, and the two end plates 42 are secured to an elongated horizontally extending base plate 44 (see FIGURES 4 and 5) which is spaced from, and extends parallel to, the deck plate 40. Completing the partial enclosure formed by the deck plate 40, end plates 42 and base plate 44 are a relatively thick, elongated forward plate 46 and a rear plate 48. The rear plate 48 is secured between the rear edges of the deck plate 40 and base plate 44 and extends parallel to the forward plate 46. It will thus be noted that the deck plate 40, end plates 42, base plate 44 and forward and rear plates 46 and 48 define a boxlike structure of rectangular transverse and longitudinal cross-section, and it is this enclosure which contains the gearing which is utilized to drive the digging or cutting members of the apparatus in an out-of-phase reciprocating motion as hereinafter described.

The construction of the transmission or driving mechanism of the invention can best be understood by referring to FIGURES 3–5 of the drawings. In referring to FIGURES 1 and 4, it will be noted that the drive shaft 34 is enclosed in a protective tubular housing 35 and extends through the deck plate 40 and through a reinforcing plate 50 which is positioned immediately below the deck plate 40. A thrust bearing 52 is provided in the deck plate 40 and reinforcing plate 50 around the drive shaft 34. The lower end of the drive shaft 34 is received in a second thrust bearing 54 which is secured to the base plate 44. Keyed to the drive shaft 34 for rotational movement therewith is a driving gear 56 which carries a plurality of peripheral gear teeth.

The driving gear 56 engages a pair of driven, blade-actuating gears 58 which are disposed on opposite sides of the driving gear 56. The driven, blade-actuating gears 58 are each mounted on a stub shaft 60 which is secured in the deck plate 40 and an underlying reinforcing plate 62 as shown in FIGURE 5. The manner of securement of the stub shaft 60 in the deck plate 40 is such that no portion of the stub shaft or its means of securement projects above the upper surface of the deck plate 40. As shown in FIGURE 3 an additional pair of driven gears 58 are provided toward each side of the machine and are spaced from each other and driven from the centrally-located driven gears by a plurality of idler gears 59. The idler gears 59 are rotatably mounted on stub shafts identically to the driven gears 58.

The driven, blade-actuating gears 58 each carry an eccentric drive pin or stud 64 which depends downwardly from the gear, and during the rotation of the gear, revolves about the rotational axis of the gear. The drive studs 64 are each offset from the rotational axis of its respective driven gear 58 in a different direction from the direction of offset of the other studs for a purpose hereinafter described. The drive stud 64 of each of the driven, blade-actuating gears 58 passes into an aperture 66 formed through a bronze bushing 68 which is slidably mounted in a keyway formed by a pair of parallel bars 70. The bushing 68 carries flanges 72 which project outwardly from the opposite edges of the bushing at the upper side thereof and these flanges rest upon and frictionally engage the upper surfaces of the elongated parallel bars 70 of the keyway. The bars 70 are welded or otherwise suitably secured at their opposite ends to a pair of elongated tubular members 74. Each of the tubular members 74 is extended through a removeable packing gland 76 threadedly mounted in the forward wall 46, and is adapted to slidably reciprocate through the packing gland. Suitable lubricating channels 78 are provided through the forward wall 46 to each of the packing glands 76 to facilitate continued lubrication of the tubular members 74 during their sliding reciprocating movement through the packing glands in a manner hereinafter described.

The forward end of each of the tubular members 74 is internally threaded to facilitate securement of the respective tubular members by a bolt 81 to an L-shaped blade mounting bracket 82. The L-shaped blade mounting brackets have a forwardly extending leg which is tapered or inclined downwardly over its forward extension, and which is welded or otherwise suitably secured to a forward blade plate 84. Each of the forward blade plates 84 is thus welded to and supported by two of the L-shaped brackets 82 and, as will be perceived in referring to FIGURES 1 and 2, terminates at its forward edge in a sharpened cutting edge 86. Each of the forward blade plates 84 is joined at its rear edge to a horizontally extending rear blade plate 86 which is superimposed on the deck plate 40. In the preferred construction, the two blade plates 84 and 86 are formed integrally and are bent from a single plate. Due to the rigid connection between the forward blade plate 84 and the rear blade plate 86, it would not be strictly correct to say that the weight of the rear blade plate 86 is carried by the deck plate 40, although under heavy loading with dirt excavated in the manner hereinafter described, the rear blade plate 86 may be resiliently biased downwardly to a very minute degree, and in this eventuality a portion of the weight imposed on the rear blade plate 86 will be transmitted to the deck plate 40.

At its rear end, each of the tubular members 74 is telescoped over a cylindrical guide rod 90. Each of the guide rods 90 is threaded into the rear plate 48 and projects horizontally therefrom over a distance which is approximately half of the distance separating the forward plate 46 from the rear plate 48. The diameter of each of the guide rods 90 is very slightly less than the internal diameter of each of the tubular members 74 and, as will be hereinafter explained, each of the guide rods 90 functions to align and guide the tubular member 74 which it slidingly engages during the reciprocating movement of the cutting blades of the apparatus.

Secured to the rear plate 48 and at the rear side of the framework 10 is a chemical distribution assembly designated generally by reference numeral 94. This assembly is best illustrated in FIGURES 3–5 and comprises an elongated, substantially V-shaped plate which includes a vertically extending leg 98 and a downwardly and rearwardly extending leg 100. The vertically extending leg 98 is welded, bolted or otherwise suitably secured to the outer surface of the rear plate 48 so that the V-shaped plate forms a downwardly facing chemical distribution enclosure or chamber 102. Secured to the vertically extending leg 98 of the V-shaped plate by a plurality of brackets 104 (see FIGURE 3) is an elongated, horizontally extending chemical distribution pipe 106. The chemical distribution pipe 106 is provided with a plurality of horizontally spaced, downwardly opening perforations 108 and is capped or closed at its opposite ends by a suitable closure cap 110. At approximately its midpoint, the chemical distribution pipe 106 enters a T-connection 112 which is connected to an upwardly extending chemical supply pipe 114. The chemical supply pipe 114 is adapted to be connected to a chemical supply reservoir or tank of any suitable type (not shown) which can be mounted on the framework 10 of the apparatus.

In the utilization and operation of the embodiment of the apparatus depicted in FIGURES 1–5 and hereinafter described, the framework 10 is connected to a self-powered vehicle such as a tractor by the use of the outer hitch brackets 20 and 22, and the central hitch bracket 26. The power take-off of the tractor is connected to the coupling 36 provided on the drive shaft 32 so that the drive shaft 32 may be driven in rotation from the tractor. The vertically extending drive shaft 34 is driven in rotation by the drive shaft 32 and causes the driving gear 56 keyed to the lower end thereof to rotate. It is to be noted that the drive shaft 34 is sealed and protected by the tubular housing 35 so that no dirt or deleterious materials may infiltrate through the deck plate 40 and reinforcing plate 50. It should also be noted at this point that the driving gear 56 as well as each of the driven, blade-actuating gears 58 and the idler gears 59 are all disposed within the sealed enclosure formed by the deck plate 50, base plate 44, forward plate 46, rear plate 48 and the two end plates 42. The enclosure may be completely filled with a lubricant during the operation of the device. In this way, all of the gears are constantly bathed in the lubricant and a constant supply of lubricant is available through the lubricant channels 78 to the packing glands 76.

Rotation of the driving gear 56 causes each of the driven gears 58 which mesh therewith to be driven in rotation, and the rotational movement is then, of course, transmitted through the gear chain which includes the idler gears 59 and the remaining driven, blade actuating gears 58. As each of the driven, blade actuating gears 58 rotates about its respective shaft 60, the drive studs 64 carried eccentrically thereon also undergo a rotational movement, and cause their respective bushings 68 each to move in its keyway 70 formed by the elongated parallel rods 70. The movement of the bushings 68, together with the confining characteristic of the parallel rods 70, causes each of the bushings 68 to reciprocate along the rods 70, and at the same time, due to the rotational movement of the drive stud 64, to move in a reciprocating or fore-and-aft direction toward and away from the forward plate 46. This latter motion of each of the bushings 68 imparts to the tubular members 74 which are rigidly connected to the parallel rods 70, a reciprocating motion in which the tubular members move through their respective packing glands 76 and cause the forward blade plates 84 to bite into the earth ahead of the earth removing apparatus. The relative locations of the drive studs 64 on the several driven, blade-actuating gears 58 is such that the blades, comprised of the forward blade plates 84 and rear blade plates 86, are driven in out-of-phase relation to each other.

Stated differently, the radial direction of displacement of each of the drive studs 64 from the axis of rotation of its respective driven, blade-actuating gear 58 is different from that of the drive studs 64 carried by every other driven, blade-actuating gear so that the position in the path of reciprocating movement of each of the bushings 68 is different from all other bushings at any given instant during the operation of the machine.

As the tubular member 74 and the forward blade plates 84 which are connected thereto are caused to undergo the described reciprocating motion, the tubular members are guided and maintained in alignment by the guide rods 90. It is again to be noted that during this reciprocating motion, both the external surface of the tubular member 74 and their internal surface which is in contact with the guide rods 90 are constantly bathed in a lubricating material.

The described drive or transmission ssytem including the gearing arranged for rotation about vertically extending shafts permits the vertical profile of the blade plates 84 and 86 to be maintained relatively shallow or low with respect to the vertical location of the base plate 44. Stated differently, the apparatus can be made compact so that little resistance is offered to the movement of dirt over the forward blade plates 84, the rear blade plates 86 and the deck plate 40.

As the tractor or other self-powered vehicle moves forward and pulls the framework 10 behind it, the blades formed by the blade plates 84 and 86 are caused to bite into the earth. Simultaneously with the motion imparted to these members by the movement of the self-powered vehicle, the described drive system causes the blades to reciprocate in out-of-phase relation to each other. The cutting edges 86 of the forward blade plates 84 thus bite into the earth with a percussive or chiseling movement with the result that a layer of earth is sliced away and is moved backwardly across the upper surfaces of the blade plates 84 and 86 from which the dirt passes rearwardly over the exposed portions of the deck plate 40. The dirt then gravitates downwardly over the downwardly and rearwardly extending leg 100 of the V-shaped plate which defines the chemical distribution chamber 102. In this mode of operation of the apparatus, the removed layer of earth is thus returned to substantially the same position which it occupied prior to the subjection of the earth to the slicing action of the machine.

It is frequently highly desirable to distribute fertilizer, herbicides or some other chemical material beneath the earth at a certain depth and in a manner such that very little of the chemical is lost to the atmosphere during such distribution. The apparatus of the present invention is ideally suited to the accomplishment of this objective. Thus, by mounting on the framework 10, a tank or reservoir containing the chemical to be distributed, a suitable feed conduit can be connected to the chemical supply pipe 114 for introducing the chemical to be distributed to the chemical distribution conduit 106 via the T-connection 112. The chemical will then be discharged from the chemical distribution conduit 106 through the horizontally spaced perforations 108 which are formed in this conduit, and which face downwardly in the chamber 102. As the fertilizer or other material to be discharged is discharged through the perforations 108 onto the soil beneath the open chamber 102, it is entrapped beneath soil passing over the upper surfaces of the several cutting blades, the deck plate 40 and the downwardly and rearwardly extending leg 100 of the V-shaped plate which forms the chemical distribution chamber. No opportunity arises for the escape through volatilization or evaporation of the chemical, and between 80 and 100 percent soil retention of the chemical is obtained in the use of the apparatus.

A different embodiment of the drive or transmission system used in the invention is illustrated in FIGURE 6 of the drawings. Since some of the structural elements there shown are identical to those which have been described in referring to the embodiment of the invention appearing in FIGURES 1 to 5, identical reference numerals have been utilized to identify the same structural elements in both embodiments. In the FIGURE 6 embodiment, a drive gear 115 is keyed to a vertically extending drive shaft 116 which corresponds in its function to the drive shaft 34 illustrated in FIGURES 1, 3, and 4. There are also provided in the FIGURE 6 embodiment a plurality of driven, blade actuating gears or sprockets 117 which correspond in number to the number of blade structures which are provided in the apparatus (six in the illustrated embodiment) and which are aligned horizontally with the drive gear 115. It is to be noted that in the embodiment depicted in FIGURE 6, the drive gear 115 and driven gears or sprockets 117 are of a smaller diameter than the gears depicted in FIGURE 3, as characterizing the earlier described embodiment of the invention. This permits a shorter stroke to be obtained with the blades of the apparatus, a characteristic which is desirable in some types of operation.

The driven gears or sprockets 117 each carry a downwardly depending drive stud 118, with the several drive studs on the sprockets being disposed in different directions relative to the rotational axes of the several sprockets for the purpose of driving the cutting blades in out-of-phase relation to each other as has been hereinbefore described. The drive gear 115 is drivingly connected to each of the sprockets 117 by an elongated continuous chain 119. The sprockets 117 and chain 119 which are disposed toward the left of the structure depicted in FIGURE 6 have been removed or broken away in order to illustrate a modification in the keyway and bushing structure which permits the blades to be driven by the sprockets and their associated drive studs 118. Thus, as will be perceived in referring to FIGURE 6, a plate 120 is welded or otherwise secured between each pair of the tubular members 74 which are secured at their forward ends to one of the blades. Each plate 120 carries a centrally disposed elongated aperture 121 which slidingly receives the drive stud 118 carried by the respective sprocket 117 located thereabove. Thus, as the several sprockets 117 are moved in rotation by the chain 119, the drive studs 118 revolve about the rotational axes of the sprockets, and in undergoing this movement, impart a rectilinear reciprocating motion to the plates 120, to the tubular members 74, and to the blades comprised of the forward blade plate 84 and rear blade plate 86 (see FIGURES 1–5).

A modified embodiment of the invention is illustrated in FIGURES 7–9. In this embodiment, a framework 123 includes a pair of horizontally spaced, vertically extending support plates 122 which are bent or wrapped at their upper ends through 90° so as to include horizontally extending hitch bracket arms 124. The hitch bracket arms 124 are each provided with an aperture 126 for receiving a hitch pin or other suitable connecting member. A pair of upwardly and inwardly extending central hitch pin brackets 128 are secured by welding, bolting or other suitable means at one of their ends to the hitch bracket arms 124 and are secured at their other ends to a forwardly extending central hitch plate 130. The central hitch plate 130 is provided with a plurality of pin apertures 132 for permitting the adjustable connection of the central hitch link of a three point hitch connection of the type conventionally carried by farm tractors and the like. The hitch plate 130 is connected at its rear end through a connecting plate 134 to a horizontal reinforcing member 136 (see FIGURE 9) which extends across the framework between the vertically extending support plates 122. A gear box 138 is secured beneath the reinforcing member 136 at the center thereof and receives a horizontally extending drive shaft 139.

The lower ends of each of the support plates 122 is connected by welding or other suitable means to a deck plate forming the upper surface of a transmission housing designated generally by reference character 140 and substantially identically constructed to the transmission housing hereinbefore described in referring to the embodiment of the invention appearing in FIGURES 1–5. A plurality of cutting blades designated generally by 142 are mounted on the transmission housing 140, and driven by reciprocating tubular members 144 also in the manner hereinbefore described. A chemical distribution chamber 146 is attached to the rear of the transmission housing 140 and also functions as previously discussed.

The embodiment of the invention depicted in FIGURES 7–9 differs from the embodiment illustrated in FIGURES 1–5 hereinbefore described primarily in the provision of vertically adjustable wheels for permitting the depth of the cutting blades to be set at any position desired in the earth. To the end of obtaining such adjustability, a forward wheel supporting frame 150 is provided and includes two parallel, horizontally extending frame members 152 which are each secured at one of their ends to the vertically extending support plates 122 and project outwardly therefrom by a cantilevered support. A transverse connecting bar 154 interconnects the frame members 152 at their forward ends. A pair of downwardly extending ears 154 is secured to the forward ends of the frame members 152, and a plurality of limiting pin apertures 156 is provided in a vertical line in each ear 154 and frame member 152. A retaining pin 158 (see FIGURES 8 and 9) is extended through one of the apertures 156 and projects outwardly therefrom for purposes hereinafter described.

The forward ground engaging wheels of the apparatus are each designated by reference numeral 160, and are rotatably mounted on stub axles 162 which are integrally formed with a U-shaped wheel bar 164. The U-shaped wheel bar 164 includes two parallel leg portions 166, and an elongated web portion 168 which extends through, and is rotatably journaled in, bearings disposed in the frame members 152. The wheel bar 164 can thus be rotated about a horizontal axis which extends parallel to the axis of rotation of the wheels 160 on the stub shafts 162. Keyed to the web portion 168 of the wheel bar 164 at a point intermediate its length, and between the frame members 152 is a crank arm 170 which is pivotally connected to a piston rod 172 which is driven by a hydraulic cylinder 174 pivotally connected to the horizontal reinforcing member 136.

Interconnectig the vertically extending support plates 122, and extending between the rear edges thereof is a horizontal support bar 180. Horizontal support bar 180 has mounted at the center thereof, a bifurcated rear wheel supporting bracket 182. The rear wheel supporting bracket 182 pivotally journals a generally O-shaped wheel bar 184 in which is rotatably mounted a wheel 186. The bracket 182 has secured thereto, a pair of downwardly depending ears 188, and the ears and bracket define a series of vertically aligned limiting pin apertures 190. A pair of limiting pins 192 are inserted in the apertures 190 and project outwardly from opposite sides of the bifurcated bracket 182.

Keyed to that portion of the O-shaped wheel bar 184 which extends between the parallel plates of the bifurcated bracket 182 is a crank arm 194. The crank arm 194 has pivotally secured to its free end, a piston rod 196 which is movably mounted in a hydraulic cylinder 198. The opposite end of the hydraulic cylinder 198 is secured to the horizontal reinforcing member 136.

In the operation of the embodiment of the invention illustrated in FIGURES 7, 8 and 9, the framework 123 is connected behind a suitablie self-powered vehicle, such as a farm tractor, by the use of the outer hitch bracket arms 124 and the central hitch plate 130. The hitch brackets formed by these members are positioned to facilitate connection of a standard three point hitch of the type carried by most agricultural tractors to the framework. With the apparatus of the invention connected behind the self-powered vehicle, the framework 123, the transmission housing 140, blades 142 and chemical distribution chamber 146 which are carried by the framework can be pulled along the ground. The depth at which the blades 142 will cut through the earth or, stated differently, the thickness of the layer of earth which will be removed by the apparatus, is determined by the position of the ground engaging wheels 160 and 186 relative to the framework 123. It will also be apparent than the angle of inclination of the blades 142 with respect to the ground can be adjusted by adjustment of the positions of the wheels 160 with respect to the wheel 186.

The wheels 160 and 186 are hydraulically actuated, but may be fixed in a desired position by the use of the pins 158 and 192. For example, when it is desired to raise the forward ground engaging wheels 160 to a higher level with respect to the framework 123 than that which is illustrated in FIGURE 7, the hydraulic cylinder 174 can be actuated to reciprocate the piston rod 172 and pivot the crank arm 170 in a vertical direction. This will in turn raise the stub axles 162 which rotatably support the forward ground engaging wheels 160. When the wheels 160 have been brought to the desired vertical position, the pins 158 can be inserted in the appropriate apertures 156 in the ears 154 and frame members 152 to prevent further upward movement of the ground engaging wheels. The wheels 160 will, of course, be biased against the pins 158 by the ground when the earth removing apparatus is in its operative position.

For adjustment of the rear wheel 186, the hydraulic cylinder 198 is actuated to reciprocate the piston 196 in the cylinder and raise or lower the wheel. The pins 192 utilized in association with the rear wheel assembly are employed in substantially the same way as the pins 158 are used in fixing the position of the forward ground engaging wheels.

An electrical-hydraulic or a pneumatic system for driving the blades used in the dirt removing apparatus of the invention in reciprocating movement is depicted in FIGURES 10–12 of the drawings. Here, a pair of double-acting piston and cylinder assemblies, designated generally by reference numerals 202 and 204, are secured to the baseplate 44, and each includes a cylinder 206 and a double-acting piston 208. Piston rods 210 and 212 are attached to each of the pistons 208 and extend from the opposite ends of the cylinders 206 in each of the assemblies 202 and 204. Fluid inlet and fluid outlet lines 214, 216, 218 and 220 extend into the opposite ends of the cylinder 206 for driving the piston 208 in reciprocation in the cylinder as hereinafter explained.

The piston rods 210 and 212 which project from opposite ends of each of the cylinders 206 are aligned in each assembly with the free ends of a pair of T-shaped cranks 224 and 226 which are pivotally secured to the baseplate 44 for pivotation about pivot pins 228 and 230. Each of the T-shaped cranks includes a cross bar 232 which is secured at its opposite ends to a pair of driving members 234 and 236. Securement of the driving members 234 and 236 to the opposite ends of the cross bar of each of the T-shaped cranks is by means of suitable connecting pins 240 which move in elongated slots 242. The driving members 234 and 236 which are connected to each T-shaped crank extend through guide sleeves 244 secured to the forward plate 46 and are secured at their ends outside of the housing formed by the end plates 42, base plate 44, forward plate 46 and rear plate 48 to suitable brackets 246 which are in turn rigidly secured to the blade plates 84.

Positioned adjacent each of the T-shaped cranks 224 and 226 which are associated with each of the double-acting piston and cylinder assemblies 202 and 204 are a pair of limit switches 250 and 252. It will be noted in referring to FIGURE 10 that the limit switches 250 and 252 are secured to the baseplate 44 in a position such that their contacts will be struck by the free ends of the elongated legs of the T-shaped cranks 224 and 226 in alternating sequence as the double-acting piston and cylinder assemblies 202 and 204 are actuated as hereinafter described.

The power fluid inlet and outlet conduits 214, 216, 218 and 220 which enter the opposite ends of each of the cylinders 206 in the two piston and cylinder assemblies 202 and 204 pass upwardly through the deck plate 40 and the reinforcing plate 50 (see FIGURE 4) and are connected to conveniently positioned three-position solenoid valves 260 which may be located at any suitable place on the framework 10. One of the two three-position solenoid valves 260 is illustrated schematically in FIGURE 11, and its relationship to other portions of the hydraulic and electrical system is there shown. Each three-position solenoid valve 260 includes a movable magnetic coil 262 which is slidable in a fixed or stationary housing 264. The fluid inlet and fluid outlet conduits 214, 216, 218 and 220 are connected to ports formed in the housing 264, such ports being effective when the movable magnetic core 262 is in the proper position, to place the power fluid inlet conduit 214 in communication with a power fluid conduit 266 connected to a pump 268, which is driven by a motor 269, and to place the power fluid outlet conduit 218 in communication with a conduit 270 which is connected to a power fluid reservoir 274. In an alternate position of the movable core 262, the stationary housing 264 is ported to place the fluid outlet conduit 220 in communication with the conduit 272 which communicates with a power fluid reservoir 274, and to place the power fluid inlet conduit 216 in communication with a power fluid conduit 276 which is connected to the pump 268. A pair of fluid bypass conduits 280 and 282 extend between the conduits 266 and 276 and the power fluid reservoir 274, and contain pressure relief valves 284 and 286, respectively.

The movable magnetic core 262 includes a pair of diametrically extending ports 290 and 292 which are positioned for sequential alignment with the conduits 218 and 214, or alternately, with the conduits 220 and 216. A pair of electrical coils 294 and 296 surround the opposite ends of the movable magnetic core 262 and function to draw the core in opposite directions through the stationary housing 264 as hereinafter described. The solenoid valve 260 is constructed so that a spring or other suitable biasing means (not shown) retains the movable magnetic core 262 in the centralized position illustrated in FIGURE 11 when neither of the electrical coils 294 or 296 is energized. Thus, there can be no flow of power fluid through the solenoid valve 260 at the time when neither of the coils 294 and 296 are energized.

The electrical circuitry used in conjunction with the hydraulic system shown in FIGURE 11, and with the mechanical system shown in FIGURE 10, for operating the electro-hydraulic drive system of these figures is depicted in FIGURE 12. A source of electrical power 300 supplies electrical power to the electrical circuit which includes a normally open main control switch 302. The circuit further includes a pair of parallel branches which include, in the one case, a normally closed limit switch 252 (see FIGURE 10), a relay coil 304, normally closed contacts 306 of a second relay, and the coil 294 used in the three-position solenoid control valve 260 (see FIGURE 11). The second parallel branch of the circuit includes the normally closed limit switch 250, the normally closed contacts 308 of the relay which includes the relay coil 304, the relay coil 310 and the coil 296 of the three-position solenoid control valve 260. It should be pointed out that this second parallel branch of the electrical circuit also includes a spring biased, normally closed, manually operated, momentary starting switch 312 which is mounted conjunctively or in combination with the main switch 302 so that when the normally open main switch 302 is manually closed to commence operation of the system, the normally closed, spring bias momentary starting switch 312 will be momentarily opened, and after such momentary opening will return to its normally closed position. The purpose of this switch will be hereinafter explained. A third parallel branch of the electrical circuit includes the motor 269 which drives the pump 268 (see FIGURE 11).

In the operation of the electro-hydraulic drive system depicted in FIGURES 10–12, the system is started in its operation by closing the normally open main switch 302. This action simultaneously momentarily opens the momentary starting switch 312. This actuation closes an electrical circuit through the normally closed limit switch 252, the normally closed contacts 306 of the relay 307 and the coil 294 of three-position solenoid control valve 260. The momentary starting switch 312 prevents the circuit from being instantaneously and concurrently completed through the normally closed limit switch 250, the contacts 308, the relay coil 310 and the solenoid valve coil 296. Thus, instantaneous energization of the relay coil 304 will cause the normally closed contacts 308 to be opened, and the immediate return of the momentary starting switch to its normally closed position will therefore not be effective to complete the circuit in the parallel branch of the overall circuit in which it is located because of the opening of these relay contacts. Thus, at this portion of the operating cycle, no current is passed through the coil 296 of the solenoid control valve 260 and the movable magnetic core 262 of this control valve moves to the left from the neutral or centralized "off" position shown in FIGURE 11. The results then is that the bore 290 through the magnetic core 262 is aligned with the power fluid inlet conduit 214 and the conduit 266. The electrical circuit through the motor 269 is also concurrently made by closure of the main switch 302 so that power fluid is immediately pumped through the conduit 266, the bore 290, and the conduit 214 to one end of one of the piston and cylinder assemblies 202 or 204. It should be reiterated at this point that the systems depicted in FIGURES 11 and 12 are duplicated for each piston and cylinder assembly which may be present in the drive system. In other words, only one solenoid three-position control valve 260 and one controlling electrical circuit is illustrated, although in the arrangement depicted in FIGURE 10, an identical system would be provided for the operation and control of the piston and cylinder assembly 204 as well as for the piston and cylinder assembly 202.

As power fluid enters the piston 206 via the inlet conduit 214, the piston 208 is driven toward the left in FIGURE 10 with the result that the piston rod 212 contacts the free end of the elongated leg of the T-shaped crank 224 strikes the movable contact of the limit switch 252, causing this switch to open. Opening of the limit switch 252 opens the circuit through the relay coil 304 and the solenoid coil 294. De-energization of the relay coil 304 permits the normally closed contacts 308 of this relay to resume their normally closed position, and thus completes a circuit through the normally closed limit switch 250, the normally closed contacts 308, the relay coil 310 and the coil 296 of the three-position solenoid control valve 260. The direction of movement of the movable magnetic core 262 of the solenoid control valve 260 is therefore reversed, and this core now moves to the right as shown in FIGURE 11. Movement of the magnetic core 262 to the right continues until the bore 292 is in registry with the conduits 220 and 272, and the bore 292 is in registry with the conduits 216 and 276. At this time, power fluid will be introduced to the other end of the cylinder 206 via the power fluid inlet conduit 216 so that the movement of the piston 208 will be reversed, i.e., it will move toward the right. This will cause the second of the T-shaped cranks 226 to be pivoted about its pivot pin 230 as the piston rod 212 biases the elongated leg of this T-shaped crank toward the right.

The effect of these rocking movements of the T-shaped cranks 224 and 226 is to drive the blade plates 84 in reciprocation through the connecting members 234 and 236. As the piston 208 moves toward the right in its cylinder 206, the power fluid contained in the right end of the piston is vented or exhausted through the conduit 220, the bore 290 and the conduit 272 into the power fluid reservoir 274.

From the foregoing description of the invention, it will have become apparent that the invention provides a highly useful, ruggedly constructed earth removing apparatus 40 which can be utilized to slice through the earth to remove a layer of dirt from the surface thereof. In the preferred construction of the device, and in one of its most useful forms of employment, the dirt removed by the blades is transmitted rearwardly across the rear blade plates and over the top of the chemical distribution chamber. It is then repositioned in substantially the same position in the earth from which it was removed and, in being returned to this position, entraps or covers a chemical which has been laid down therebeneath by distribution from the chemical distribution pipe extending lengthwise inside the chemical distribution chamber.

Although several exemplary embodiments of the invention have been depicted in the drawings and described in the foregoing specification in order to provide guidelines to enable those skilled in the art to practice the invention, it is to be understood that certain structural modifications and innovations, though not depicted or described, can be made in the structure which has been discussed without relinquishment of, or departure from, the basic principles of the invention. All such modifications and changes which continue to rely on the basic principles of the invention are deemed to be circumscribed by the spirit and scope of the invention except as the same may be necessarily limited by the appended claims or reasonable equivalents thereof.

I claim:
1. Dirt removing apparatus comprising:
a framework;
a transmission housing secured to the lower portion of the framework;
a plurality of blades each having a forward, digging portion disposed on one side of said transmission housing, and a horizontally extending, rear portion extending over and reciprocably movable across the top of said transmission housing, each of said blades being reciprocable in out-of-phase relation to each other;
transmission means in said transmission housing and including members extending out of said housing and connected to said blades; and
chemical distribution means on the opposite side of said transmission housing from the forward digging portion of said blades for distributing a chemical under a layer of soil removed from the earth by said blades.

2. Dirt removing apparatus as defined in claim 1 wherein said framework includes a pair of vertically extending frame members;
and said transmission housing comprises a hollow parallelepiped structure secured to the lower ends of said vertically extending frame members.

3. Dirt removing apparatus as defined in claim 2 wherein said transmission means comprises:
a drive shaft extending downwardly from said framework through the top of said transmission housing;
a driving gear keyed to said drive shaft;
a plurality of rotatably mounted driven elements corresponding in number to said blades;
means for converting rotational movement to rectilinear movement interconnecting the driven elements to said members extending out of said housing and connected to said blades; and
means drivingly connecting said driving gear to said rotatably mounted driven elements.

4. Dirt removing apparatus as defined in claim 2 wherein said chemical distribution means comprises:
a first plate extending outwardly and downwardly from an upper side edge of said parallelepiped structure;
a pair of vertically extending end plates connected between the opposite ends of said first plate and said parallelepiped structure and defining with said first plate and parallelepiped structure, an elongated, downwardly opening chemical distribution space;
a chemical distribution pipe in said space and having therein a plurality of horizontally spaced, downwardly opening perforations; and
conduit means extending through said first plate and connected to said chemical distribution pipe for conveying a chemical to be distributed to said pipe.

5. Dirt removing apparatus as defined in claim 1 wherein said transmission means comprises:
a driving gear;
a drive shaft keyed to said driving gear and extending upwardly from said transmission housing;
a plurality of rotatably mounted driven elements corresponding in number to said blades;
means for converting rotational movement to rectilinear movement interconnecting the driven elements to said members extending out of said transmission housing and connected to said blades; and
means drivingly connecting said driving gear to said rotatably mounted driven elements.

6. Dirt removing apparatus as defined in claim 5 wherein said means drivingly connecting said driving gear to said rotatably mounted driven elements comprises an elongated endless chain.

7. Dirt removing apparatus as defined in claim 5 wherein said means drivingly connecting said driving gear to said rotatably mounted driven elements comprises a plurality of idler gears.

8. Dirt removing apparatus as defined in claim 1 wherein said chemical distribution means comprises:
a plurality of interconnected plates defining a downwardly opening chamber;
a chemical distribution pipe in said chamber and having therein a plurality of horizontally spaced, downwardly opening perforations; and
means for introducing a fluent chemical to said chemical distribution pipe.

9. Dirt removing apparatus as defined in claim 1 wherein said framework includes a pair of outer hitch brackets, and a central hitch bracket between said outer hitch brackets.

10. Dirt removing apparatus as defined in claim 1 and further characterized to include a plurality of vertically adjustable, ground engaging wheels mounted on said framework.

11. Dirt removing apparatus as defined in claim 1 wherein said transmission means comprises:
   piston and cylinder means in said transmission housing and drivingly engaging said members extending out of said housing for driving said blades in a reciprocating motion as said piston and cylinder means is actuated;
   electrical solenoid valve means for selectively controlling flow of power fluid to said piston and cylinder means; and
   electrical circuitry including limit switches opened and closed by movement of the several blades for sequencing said solenoid valve means to control the actuation of said piston and cylinder means to reciprocate said blades out of phase with each other.

12. Dirt removing apparatus as defined in claim 11 wherein said transmission means further includes at least one pair of T-shaped cranks each having a cross bar and an elongated leg secured to the center of said cross bar, each of said cross bars having its opposite ends positioned for driving engagement with two of said members connected to two of said blades, and each of said T-shaped cranks being pivotally mounted in said transmission housing for pivotation in a generally horizontal plane; and
   wherein said piston and cylinder means comprises a double acting piston and cylinder assembly positioned between each adjacent pair of T-shaped cranks and having the piston thereof aligned with the free ends of the elongated legs of the respective adjacent pairs of T-shape cranks for alternately pivoting the cranks about their pivotal axes as said pistons are reciprocated in their cylinders.

13. Dirt removing apparatus comprising:
   a framework including
     a pair of vertically extending frame members,
     a pair of outer hitch brackets, and
     a central hitch bracket;
   a horizontally extending deck plate secured to the lower ends of each of said vertically extending frame members;
   plate means connected to said deck plate and forming an enclosure therewith;
   blade driving means extending horizontally through said plate means at one side thereof;
   a plurality of blades connected to said blade driving means and each having a forward blade plate inclined downwardly and away from one side of said enclosure, and a rear blade plate extending over, parallel to, and in juxtaposition with said deck plate;
   means in said enclosure for driving said blade driving means and the blades connected thereto in a reciprocating motion, each of said blades being reciprocable in out-of-phase relation to each other; and
   chemical distribution means secured to said plate means on the opposite side thereof from said blade driving means for depositing a chemical under a layer of earth removed by said blades and moved rearwardly across said rear blade plates and the deck plate.

14. Dirt removing apparatus as claimed in claim 13 wherein said plate means comprises:
   a pair of vertically extending end plates connected to the opposite ends of said deck plate and extending downwardly therefrom;
   a horizontally extending base plate extending parallel to said deck plate and connected between the lower edges of said vertically extending end plates;
   a vertically extending forward plate interconnecting the end plates and the forward edges of the deck plate and base plate, said forward plate having apertures therein accommodating said horizontally extending blade-driving means; and
   a vertically extending rear plate spaced from, and extending parallel to, said forward plate, said rear plate interconnecting the end plates, deck plate and base plate, and secured to and supporting said chemical distribution means.

15. Dirt removing apparatus as claimed in claim 14 and further characterized to include:
   a pair of horizontally spaced, ground engaging wheels adjustably connected to said framework for relative positioning in a vertical direction, said wheels being horizontally spaced from the forward blade plates on the opposite side thereof from said rear blade plates.

16. Dirt removing apparatus as claimed in claim 15 and further characterized to include a third ground engaging wheel adjustably connected to said framework and positioned on the opposite side of said framework from said first mentioned pair of ground engaging wheels.

17. Dirt removing apparatus as claimed in claim 13 wherein said blade driving means comprises:
   a plurality of parallel, horizontally extending rods each secured at one end to said rear plate and extending toward said forward plate; and
   elongated tubular members slidingly telescoped over the other ends of said rods and extending slidingly through said forward plate and connected at their ends outside said enclosure to said blades.

18. Dirt removing apparatus as claimed in claim 17 wherein said driving means comprises:
   a driving gear; and
   a plurality of driven members actuated by said driving gear and drivingly connected to each of said tubular members for driving said tubular members in a reciprocating movement.

19. In a dirt removing apparatus of the type including a framework and means for connecting the framework to a tractor, the improvement comprising:
   a transmission housing connected to the lower portion of the framework;
   blades reciprocably mounted on the transmission housing and bent so that a first portion of each blade extends across the top of the transmission housing, and a second portion of each blade extends outwardly and downwardly from the first portion of each blade and from one side of the transmission housing, said blades having all of the first portions thereof aligned in a common horizontal plane, and all of the second portions thereof passing through a second common plane during their reciprocation, each of said blades being reciprocable in out-of-phase relation to each other;
   transmission means connected to said blades and having a major portion thereof located in said transmission housing; and
   chemical distribution means mounted on said transmission housing on the opposite side thereof from the second portions of said blades.

20. The improvement claimed in claim 19 and further characterized to include at least three horizontally spaced, vertically adjustable ground engaging wheels mounted on said framework and facilitating adjustment of the depths said blades will pass through the earth.

References Cited

UNITED STATES PATENTS

| | | | |
|---|---|---|---|
| 2,614,476 | 10/1952 | Jennings | 172—101 X |
| 3,146,740 | 9/1964 | Phillips | 111—7 |
| 3,295,480 | 1/1967 | Haynes | 111—6 |
| 3,310,011 | 3/1967 | Miller | 111—7 X |

ROBERT E. BAGWILL, *Primary Examiner.*

U.S. Cl. X.R.

172—101